United States Patent
Suzuki

(10) Patent No.: US 7,338,810 B2
(45) Date of Patent: Mar. 4, 2008

(54) SUBSTRATE PROCESSING METHOD AND METHOD FOR MANUFACTURING PROBE CARRIER

(75) Inventor: Tomohiro Suzuki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 672 days.

(21) Appl. No.: 10/459,498

(22) Filed: Jun. 12, 2003

(65) Prior Publication Data

US 2004/0053305 A1 Mar. 18, 2004

(30) Foreign Application Priority Data

Jun. 18, 2002 (JP) .............................. 2002-177287

(51) Int. Cl.
*G01N 33/543* (2006.01)

(52) U.S. Cl. ..................................................... 436/518

(58) Field of Classification Search ........ 436/514–548; 435/4–7.95, 283.1–289.1; 422/50–73
See application file for complete search history.

(56) References Cited

U.S. PATENT DOCUMENTS 5,102,983 A * 4/1992 Kennedy .................... 528/354
5,840,585 A * 11/1998 Rodkey et al. ............. 436/161
6,790,613 B1 * 9/2004 Shi et al. ........................ 435/6
7,060,268 B2 * 6/2006 Andya et al. ............. 424/130.1
2002/0090640 A1 7/2002 Kuhara et al. .................. 435/6
2003/0068416 A1 * 4/2003 Burgess et al. ............. 426/384

FOREIGN PATENT DOCUMENTS

GB 2 355 716 A 5/2001
JP 2000-295990 10/2000
JP 2001-21558 1/2001
WO WO 93/00807 * 1/1993

* cited by examiner

*Primary Examiner*—Ann Y. Lam
(74) *Attorney, Agent, or Firm*—Fitzpatrick, Cella, Harper & Scinto

(57) ABSTRACT

The invention provides a method for drying a probe immobilizing surface for preventing components of a probe solution used for immobilizing the probes from being left behind when the probe immobilizing surface of the substrate is dried.

16 Claims, 1 Drawing Sheet

SUBSTRATE PROCESSING METHOD AND METHOD FOR MANUFACTURING PROBE CARRIER

BACKGROUND OF THE INVENTION

1. Field of the Invention

The present invention relates to a method for drying a substrate having probes immobilized on the surface thereof.

2. Description of the Related Art

Measurements and detection of biological specimens have been urgently required with the advance of the biotechnology. However, different from chemical substances obtained by chemical synthesis methods, strict measurements of the biological specimen are often difficult for the following reasons:

1) the properties of the biological specimens are quite diverse;
2) the quantity of the sample available is very small; and
3) samples having similar physical properties should be discriminated.

While various methods have been devised for measuring these specimens, the most noteworthy measuring technique among them utilizes a solid phase substrate. In the measuring technique using the solid phase substrate, a probe that specifically binds a specimen as a detection object is immobilized on the surface of a solid such as a glass substrate, a test sample labeled with a fluorescent substance is allowed to react with the substrate, and the components of the test sample are assayed by bonding of the test sample, if any, to the probe.

This measuring technique is mainly of note for the following reasons (advantages):

1) a quite minute quantity of the test sample can be measured by reducing the amount (area) of the detection probe immobilized on the substrate, and the quantity of the sample becomes very small;
2) many test items can be simultaneously measured by aligning various kinds of detection substances on the substrate; and
3) handling of the system is easy, since the measurement is possible using a solid phase in place of a liquid phase.

The measurement of the sample using the solid phase substrate has been applied, for example, to detection of sequences of a nucleic acid. Many kinds of single strand DNAs (DNA probes) having various sequences are immobilized on the substrate as an array, and DNAs labeled with a fluorescent pigment are allowed to hybridize with the probes. The fluorescent substance is immobilized (hybridized) on the substrate where the test sample contains a sequence complementary to the DNA on the substrate, and the sequence contained in the test sample can be determined with reference to the sequence of the DNA probe immobilized on the substrate. For example, Takara Bio Inc. sells DNA micro-arrays prepared by immobilizing several hundreds kinds of probe DNAs immobilized on slide glasses, and these products are used for analysis of various genes.

While a number of methods have been devised for manufacturing the DNA micro-array, the frequently used method comprises dissolving a DNA that serves as the probe in a given solution, adhering the DNA solution at a sharp tip of a needle, and supplying a quite minute quantity of the DNA solution onto a glass substrate after an appropriate surface treatment. The DNA micro-array manufactured by this method is subjected to drying after a prescribed immobilizing treatment. When the probe component remaining on the surface of the substrate is to be washed away, the substrate is washed with purified water or a buffer solution followed by drying the substrate.

Japanese Unexamined Patent Laid-Open No. 2001-021558 discloses a method for drying droplets after spotting without washing. Japanese Unexamined Patent Laid-Open No. 2000-295990 discloses a method in which the probe is dried by washing with ethanol after washing with a buffer solution after spotting.

When the probe is not cleaned after preparing the DNA micro-array, the components in the probe solution precipitate in the spotting region, and the function of the probe may be deteriorated by the precipitate. While the surface of the substrate is often cleaned to avoid the function of the probe from deteriorating, fine droplets of the cleaning solution may be left behind immediately after washing with the buffer solution. Many water molecules and buffer components may be left behind on the surface of the substrate from a microscopic point of view. Conventionally, the droplets may be blown away by placing the substrate in a high speed air stream, or placing the substrate in a centrifuge. However, salts contained in the buffer solution may precipitate at the boundaries among the droplets in this droplet removing step. Precipitation of the salts as the solute may cause various errors and irregularity in the use of the DNA micro-array as a result of increased salt concentration in the DNA hybridization process and non-specific adsorption of the sample. Moreover, the fact that the probe on the surface of the substrate is unevenly exposed to an environment of high salt and solute concentration is not preferable, since the function of the probe may deteriorate, although this phenomenon occurs in microscopic regions.

As a countermeasure to the phenomena above, the substrate is washed with purified water in order to remove as much solute in the residual droplets as possible, or the substrate is dried using volatile alcohols, such as ethanol. However, much labor is required to completely remove the precipitate, and it is often difficult to avoid the precipitate from being irregularly left behind even when the amount of the residual precipitate is permissible. These problems occur to the same extent as when the buffer solution is used. Exposing the probe to a hot organic solvent is also not preferable, since the probe faces a high risk of having its function deteriorate. It may be conjectured that the probe interacts with the surface of the solid phase during storage in a dry state after the drying step, and the function of the probe is deteriorated.

SUMMARY OF THE INVENTION

Accordingly, the object of the invention is to provide an appropriate method for drying the substrate having probes on the surface.

The invention completed by the inventors through intensive studies provides a method for treating a substrate having a probe immobilizing surface capable of specifically binding a target substance. The method comprises the steps of supplying a liquid onto the probe immobilizing surface, freezing the probe immobilizing surface together with the liquid, and removing solvent components at the frozen part by sublimation by placing the probe immobilizing surface under a reduced pressure.

Irregular deposition of solute components on the probe immobilizing surface can be prevented by applying this treatment since the solvent components are continuously removed from the surface of the substrate. In addition, this treatment is preferable from the view point of maintaining the performance of the probe, since the drying process can be applied while the probe on the surface of the substrate is maintaining a stereoscopic structure in the liquid without interacting with the surface of the substrate. Furthermore, the drying process can be applied by permitting the solutes in the liquid to be left behind on the surface of the substrate in a desired state, by controlling the thickness of the frozen solution on the surface of the substrate.

The substrate processing method of the invention is advantageous for avoiding local precipitation of the solute components that cause irregular deposition and for protecting the function of the probes from being deteriorated by the drying treatment in the drying process after forming the probe array comprising the probes immobilized on the substrate. Employing the substrate processing method of the invention enables other substances such as sugars to be uniformly supplied on the surface of the substrate for the purpose of maintain the function of the probe.

The invention also provides a method for manufacturing a probe carrier using the substrate processing method described above.

The invention provides a method for manufacturing a probe carrier on which probes capable of specifically binding a target substance are immobilized, comprising the steps of: immobilizing the probes on a substrate, supplying a liquid on the probe immobilizing surface; freezing the probe immobilizing surface together with the liquid; and removing solvent components at the frozen part by sublimation by placing the probe immobilizing surface under a reduced pressure.

The manufacturing method according to the invention enables a probe carrier to be provided, wherein irregular deposition of solute components on the probe immobilizing surface is prevented since the solvent components are continuously removed from the surface of the substrate.

The probe carrier on which components dissolved or dispersed in the solution are allowed to be uniformly left behind on the surface of the substrate can be provided by employing the manufacturing method of the invention.

The manufacturing method of the invention is preferable from the view point of maintaining the performance of the probe, since the drying process is applied while the probe on the surface of the substrate is maintaining a stereoscopic structure in the liquid without interacting with the surface of the substrate.

Further objects, features and advantages of the present invention will become apparent from the following description of the preferred embodiments (with reference to the attached drawings).

DESCRIPTION OF THE PREFERRED EMBODIMENTS

Figure 1:
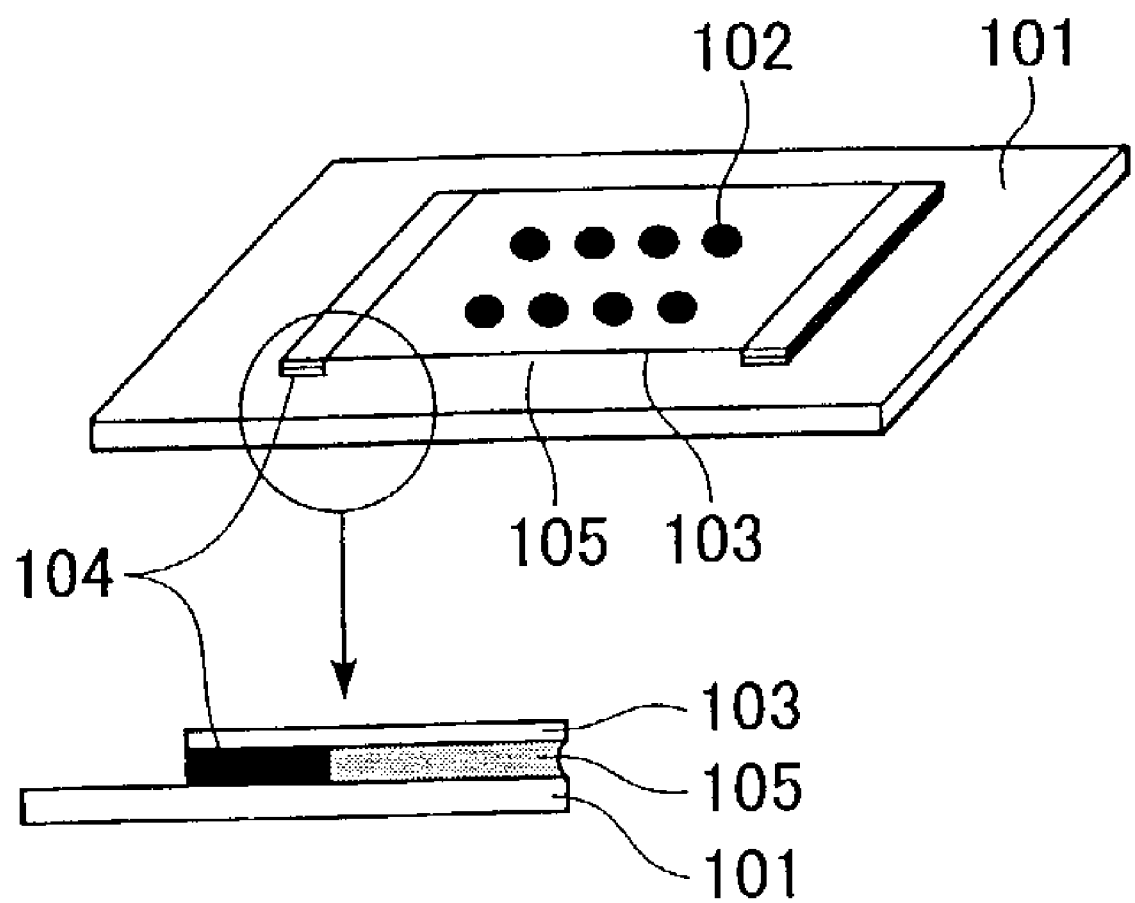
FIG. 1 is a schematic drawing of the probe immobilized substrate of the invention, where a gap cover glass is attached on a DNA probe array, a space is formed above the surface of the array, and an aqueous solution of glucose is injected into the space.

The method for drying the substrate of the invention is described below in detail.

The invention comprises the steps of:
(1) manufacturing a substrate on the surface of which probes are immobilized by bonding or absorption;
(2) retaining a liquid on substrate by supplying the liquid on the surface of the substrate after washing the surface of the substrate with an appropriate liquid;
(3) freezing the liquid by refrigerating the substrate and liquid; and
(4) removing only the solvent components in the liquid by placing the substrate and frozen liquid under a reduced pressure.

In a representative example for manufacturing the probe immobilized substrate as a first step of the invention, a DNA micro-array is formed. While the DNA array usually comprises various kind of DNAs as probes adsorbed on the surface of a glass substrate after an appropriate surface treatment, or a probe DNA immobilized on the glass substrate by a thigh bonding such as covalent bonds, a resin substrate or a substrates having a surface coated with a thin metal layer is also available. The drying method of the invention is applicable so long as the substrate requires a cleaning step in the manufacturing process of the substrate While examples of the probe for detecting the nucleic acid usually include nucleic acids represented by oligonucleotides and cDNAs, probes other than the nucleic acid such as PNA (peptide nucleic acid) may be used. The method of the invention is applicable when peptides and proteins are used for detecting the protein.

In the next step, the probe immobilized substrate may be cleaned by a method that is appropriate for manufacturing a probe immobilized substrate. The cleaning method is applied to remove free probe components that were not immobilized on the surface of the substrate while avoiding peeling off the probes that were immobilized on the surface of the substrate and without deteriorating the function of the immobilized probes. A liquid that can sufficiently dissolve the probe and the liquid used for supplying the probe onto the surface of the substrate is usually used. A highly volatile liquid and a liquid that leaves traces of the liquid on the surface of the substrate after cleaning are desirably avoided.

The liquid available for use in the next step for supplying and retaining the liquid on the surface of the substrate include water, liquid media mainly comprising water and buffer solutions. A solution containing a sugar or an amino acids having an affinity to the probe may be used for protecting the probe after drying the substrate, or an organic solvent or a liquid mainly comprising the organic solvent may be also used. The organic solvent available include, for example, dimethylsulfoxide.

While the concentration of the aqueous solution containing salts, sugars and amino acids as a solvent supplied is not restricted, the concentration represented by the proportion by weight is desirably in the range of 0.001% to 5%, more desirably in the range of 0.001% to 1%.

While the liquid is most readily supplied by immersing the entire substrate into the liquid to be supplied, an appropriate space may be provided above the probe immobilizing surface in order to control the amount and thickness of the liquid, followed by injecting the liquid into the space. For example, the space having a given thickness can be formed on the probe immobilizing surface by using a gap cover glass devised so as to maintain a given thickness of the liquid. The liquid is filled in the space, and the liquid is directly frozen in this case. As a result, the volume of the liquid used can be reduced while permitting the solute components to be uniformly left behind on the surface of the substrate after a drying treatment. For example, a compound abundant in hydroxyl groups such as sugars that contributes to stabilization of the nucleic acid may be left behind. Representative examples of the sugar include glucose, fructose and galactose. Substances other than the sugars such as amino acids including glycine, lysine, glutamine, glutamic acid and histidine may be useful for stabilization depending on the kind of the probe.

In the next step for freezing the liquid, the vessel filled with the liquid, into which the entire substrate is immersed, is refrigerated to below the freezing point of the liquid to freeze the liquid. While the liquid may be frozen by refrigerating the entire system when a space is formed over the surface of the substrate for controlling the thickness of the liquid, the cover glass may be fixed for avoiding the effect of volume expansion of the liquid by freezing when the thickness of the liquid after freezing is desired to be uniform.

In the step for removing the components of the frozen solvent as the final step, a conventionally used lyophilizer may be used. The temperature of the sample chamber attached to the lyophilizer is desirably adjusted to below the freezing point of the liquid. The drying treatment is possible using a conventionally used vacuum pump and vacuum desiccator without using the lyophilizer.

In any of the methods above, it is preferable to maintain a degree of vacuum to an extent that allows the frozen liquid not to be melted during the drying treatment.

EXAMPLE

The invention will be described in more detail with reference to the examples. While these examples are some of the best ways for carrying out the invention, the invention is by no means restricted to these examples.

Example 1

Preparation of DNA Probe Array

[1] Cleaning of glass substrate: A synthetic quartz glass substrate (1 inch×1 inch×0.5 mm) was placed in a alkali resistant rack and immersed in a detergent solution for ultrasonic cleaning adjusted into a prescribed concentration. After immersing in the cleaning solution overnight, the substrate was cleaned by ultrasonic cleaning for 20 minutes. Subsequently, the substrate was taken out of the cleaning solution and, after lightly rinsing with purified water, it was cleaned in ultra-pure water for 20 minutes while applying an ultrasonic wave. Subsequently, the substrate was immersed in a 1 mol/liter aqueous sodium hydroxide solution heated at 80° C. for 10 minutes. A quartz glass substrate for the DNA microarray was prepared by cleaning with purified water and ultra-pure water again.

[2] Surface treatment: A silane coupling agent (KMB-603 made by Sin-Etsu Silicone Co.) was dissolved in purified water in a concentration of 1%, and the solution was stirred for 2 hours at room temperature. Then, the glass substrate that had been cleaned was immersed in the aqueous coupling agent solution followed by leaving at room temperature for 20 minutes The glass substrate was pulled up and, after lightly cleaning the surface with purified water, the substrate was dried by blowing both surfaces of the substrate with nitrogen gas. Then, the silane coupling treatment was completed by baking the dried substrate for 1 hour in an oven heated at 120° C. to introduce amino groups on the surface of the substrate. Then, an EMCS solution was prepared by dissolving N-(6-meleimidecaproyloxy)succinimide (made by Dojin Laboratories, Inc.; abbreviated as EMCS hereinafter) in a 1:1 mixed solvent of dimethylsulfoxide and ethanol so that the final concentration of EMCS becomes 0.3 mg/ml. The glass substrate after baking was allowed to cool, and was immersed in the EMCS solution prepared as described above at room temperature for 2 hours. The amino group introduced onto the surface of the substrate by the silane coupling agent is allowed to react with the succinimide group in EMCS by this treatment, and the maleimide group was introduced onto the surface of the glass substrate. The glass substrate pulled up from the EMCS solution was washed with the mixed solvent described above and, after cleaning with ethanol, it was dried in a nitrogen atmosphere.

[3] Synthesis of Probe DNA: An 18-mer probe DNA having the following sequence with a 5'-terminal modified with a thiol was synthesized by a conventional method.

Sequence number 1:
5'-HS-(CH2)6-O-PO2-O-ACTAGGCCGTCGTTT-TACA-3'

The synthesized DNA was purified by high performance liquid chromatography followed by desalting and drying, and was used for the following experiment.

[4] Discharge of DNA by BJ printer, and immobilization on the substrate: Prepared was an aqueous solution containing 7.5 wt % of glycerin, 7.5 wt % of thiodiglycol, 7.5 wt % of urea and 1.0 wt % of Acetylenol EH (made by Kawaken Fine Chemicals Co.). Subsequently, the previously synthesized sequence No. 1 single strand DNA was dissolved in the mixed solvent above so that the final concentration becomes 50 microgram/ml.

The DNA solution obtained was filled in an ink tank for a bubble-jet printer (trade name BJ F850 made by Canon Inc.), and the tank was mounted on a printing head of the printer.

The bubble-jet printer used herein had been reconstructed so as to be compatible with lithographic printing. The bubble-jet printer was made to be able to spot about 5 picoliter of the DNA solution at about 120 micrometer pitch by memorizing a printing pattern according to a prescribed file forming method. Subsequently, a total of 144 spots comprising 12 spots in the longitudinal and transverse directions, respectively, were spotted on a sheet of glass substrate using the reconstructed bubble-jet printer.

After confirming that the spots had been reliably printed, the substrate was placed in a heating chamber for 30 minutes to allow the maleimide group on the surface of the glass substrate to react with the thiol group at the terminal of the nucleic acid probe.

[5] Cleaning: After 30 minutes' reaction, the DNA solution remaining on the surface of the glass substrate was washed away with a 100 mM phosphate buffer solution (pH 7.0; named as buffer solution (1) hereinafter) containing 100 mM of NaCl, thereby obtaining the DNA probe having DNA immobilized on the surface of the glass substrate.

Example 2

[1] Preservation in buffer solution: The DNA probe array obtained in Example 1 was placed in buffer solution (1) so that the surface on which the probe has been immobilized is sufficiently soaked in the buffer solution, and was preserved in a refrigerator controlled at 4° C. for 14 days.

[2] Blocking: Bovine serum albumin (BSA; made by Sigma Aldrich Co.) was dissolved in buffer solution (1) in 2% concentration. After confirming that albumin had been completely dissolved, the DNA probe array preserved in the buffer solution at 4° C. was soaked in the BSA solution at room temperature for 2 hours for a blocking reaction with BSA.

[3] Hybridization: A single strand DNA having a complementary sequence with sequence No. 1 DNA and labeled with rhodamine at the 5'-terminal was synthesized. The single strand DNA was purified by high performance liquid chromatography as the probe DNA was, thereby obtaining a labeled single strand DNA. The labeled DNA was dissolved in buffer solution (1) in a final concentration of 5 nmol/liter to prepare 25 ml of a hybridization solution.

Subsequently, one sheet of the DNA array after blocking was soaked in 25 ml of the hybridization solution that had been heated at 45° C. for a hybridization reaction for 2 hours. The substrate was taken out of the solution thereafter and, after appropriately washing the DNA array with buffer solution (1), it was observed with a scanner (GeneOix 4000B made by AXON Co.) that is exclusively used for scanning of micro-arrays. The sensitivity of the photomultiplier and laser output were set at 400V and 100%, respectively, for the measurement using GenePix scanner.

[4] Results: Fluorescence intensities of all the 144 spots on the DNA probe array were measured by a conventional method. A fluorescence intensity of 4400 was obtained as an average of the intensities of 144 spots.

Example 3

Preservation After Freeze Drying

After washing the surface of the DNA probe array obtained in Example 1 with purified water, the DNA probe array was placed in a vessel (bottom face 3 cm×3 cm) filled with 5 ml of purified water so that the probe immobilized face comes upside. The substrate soaked in purified water was placed in a refrigerator at −25° C. together with the vessel, and purified water in the vessel was completely frozen while the DNA probe array was soaked in purified water. Then, the vessel containing the probe array was transferred into a sample chamber of a lyophilizer previously refrigerated at −25° C. and, after confirming that purified water remains frozen, a vacuum pump was energized for drying under a reduced pressure. Purified water in the vessel was completely sublimated in 6 hours. After confirming that only the DNA probe array remains in the vessel, the temperature in the dryer was increased to room temperature. After keeping vacuum drying for 1 hour before the temperature of the DNA probe array returns to room temperature, the vacuum pump was stopped, and the DNA array was taken out of the chamber.

The DNA probe array after freeze drying was preserved in a desiccator controlled at a relative humidity of 5% or less for 14 days.

The DNA probe array was subjected to the blocking reaction and treatments thereafter under the same conditions as in Example 2. Fluorescence intensities of all the 144 spots on the substrate were measured by the conventional method as in Example 2, and a fluorescence intensity of 4200 was obtained as a mean intensity of 144 spots.

Example 4

Freeze Drying

After washing the surface of the DNA probe array obtained in Example 1 with purified water, the surface of the substrate was covered with a sheet of gap cover glass (size 24 mm×25 mm, thickness of the gap 20 micrometer; made by Matsunami Glass Co.) so that the array portion is accommodated in the gap, and the cover glass was fixed so that it does not slip off. Subsequently, a 1% aqueous solution of glucose was prepared, and the solution was injected into the space between the DNA probe array and cover glass. FIG. 1 illustrates the DNA probe array covered with the cover glass.

In FIG. 1, the reference numeral 101 denotes a substrate, the reference numeral 102 denotes a probe, the reference numeral 103 denotes a gap cover glass, the reference numeral 104 denotes a spacer, and the reference numeral 105 denotes an aqueous glucose solution.

After confirming that the space is sufficiently filled with the glucose solution, the substrate was placed in a refrigerator at −25° C. to completely freeze the glucose solution in the space. Subsequently, the substrate was transferred into the chamber of the lyophilizer as in Example 3 for freeze drying. After about 24 hours, it was confirmed that the solvent component in the aqueous glucose solution had been completely sublimated. After keeping the substrate to dry in vacuum for an additional 1 hour before the temperature of the DNA probe array returned to room temperature, the vacuum pump was stopped and the DNA probe away was taken out of the chamber.

The gap cover glass remaining on the surface was removed, and the probe array was storage in the desiccator controlled at a humidity of 5% or less for 14 days.

The DNA probe array was subjected to the blocking reaction and treatments thereafter under the same conditions as in Example 2. Fluorescence intensities of all the 144 spots on the substrate were measured by the conventional method as in Example 2, and a fluorescence intensity of 3950 was obtained as a mean intensity of 144 spots.

Sequence Listing
<110> CANON INC.
<120> Liquid Composition Method for plate preparation for dissolving a probe
<130> 4629091
<160> 2
<210> 1
<211> 18
<212> DNA
<220>
<223> Sequence for hybridization test
<400> 1
actggccgtc gttttaca 18

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

SEQUENCE LISTING

<160> NUMBER OF SEQ ID NOS: 1

<210> SEQ ID NO 1
<211> LENGTH: 18
<212> TYPE: DNA
<213> ORGANISM: Artificial Sequence
<220> FEATURE:
<223> OTHER INFORMATION: Sequence for Hybridization Test

<400> SEQUENCE: 1
actggccgtc gttttaca                                                18

What is claimed is:

1. A method for processing a non-porous substrate having a probe immobilizing surface on which probes capable of specifically binding a target substance are immobilized, the method comprising the steps of:
   supplying a liquid including the probes onto the surface of the non-porous substrate to immobilize the probes on the substrate;
   setting a sheet of a material to form a space between the substrate and the material for accommodating the probes;
   injecting a solution into the space;
   freezing the non-porous substrate together with the solution; and
   placing the non-porous substrate under a reduced pressure to sublimate solvent components in the solution frozen in the freezing step,
   wherein the substrate is cleaned after supplying the liquid, but before setting the sheet of the material.

2. The method for processing the substrate according to claim 1, wherein a thickness of the solution frozen on the probe immobilizing surface is uniform.

3. The method for processing the substrate according to claim 1, wherein the non-porous substrate is made of glass, resin or metal.

4. The method for processing the substrate according to claim 1, wherein a nucleic acid or PNA probe is immobilized on the non-porous substrate.

5. The method for processing the substrate according to claim 1, wherein a peptide or protein probe is immobilized on the non-porous substrate.

6. The method for processing the substrate according to claim 1, wherein the solution is water.

7. The method for processing the substrate according to claim 1, wherein the solution is an aqueous medium mainly comprising water.

8. The method for processing the substrate according to claim 7, wherein the aqueous medium contains salts.

9. The method for processing the substrate according to claim 7, wherein the aqueous medium is a buffer solution.

10. The method for processing the substrate according to claim 7, wherein the aqueous medium contains sugars.

11. The method for processing the substrate according to claim 10, wherein the sugar comprises at least one of glucose, fructose and galactose.

12. The method for processing the substrate according to claim 7, wherein the aqueous medium contains amino acids.

13. The method for processing the substrate according to claim 12, wherein the amino acid comprises at least one of glycine, lysine, glutamine, glutamic acid and histidine.

14. The method for processing the substrate according to claim 1, wherein the liquid mainly comprises organic solvents.

15. A method for manufacturing a probe carrier on which probes capable of specifically binding a target substance are immobilized, comprising the steps of:
    immobilizing the probes on a surface of a non-porous substrate;
    setting a sheet of a material to form a space between the substrate and the material for accommodating the probes;
    injecting a solution into the space to freeze the probe immobilizing surface together with the solution; and
    placing the surface under a reduced pressure to remove solvent components in the solution frozen with the probe immobilizing surface by sublimation,
    wherein the substrate is cleaned after immobilizing the probes, but before setting the sheet of the material.

16. A method for processing a substrate having a probe immobilizing surface on which probes capable of specifically binding a target substance are immobilized, the method comprising the steps of:
    supplying a liquid including the probes onto the surface of the substrate to immobilize the probes on the substrate;
    setting a sheet of a material to form a space between the substrate and the material for accommodating the probes;
    injecting a solution into the space;
    freezing the substrate together with the solution; and
    placing the substrate under a reduced pressure to sublimate solvent components in the solution frozen in the freezing step,
    wherein the substrate is cleaned after supplying the liquid, but before setting the sheet of the material.

* * * * *

UNITED STATES PATENT AND TRADEMARK OFFICE
CERTIFICATE OF CORRECTION

PATENT NO. : 7,338,810 B2
APPLICATION NO. : 10/459498
DATED : March 4, 2008
INVENTOR(S) : Tomohiro Suzuki It is certified that error appears in the above-identified patent and that said Letters Patent is hereby corrected as shown below:

COLUMN 2:

Line 67, "view point" should read -- viewpoint --.

COLUMN 3:

Line 18, "maintain" should read -- maintaining --; and
Line 41, "view point" should read -- viewpoint --.

COLUMN 4:

Line 42, "acids" should read -- acid --.

COLUMN 5:

Line 37, "a" should read -- an --; and
Line 63, "N-(6-meleimidecaproyloxy)succinimide" should read
-- N-(6-maleimidecaproyloxy)succinimide --.

COLUMN 6:

Line 14, "5'-HS-(CH2)6-O-PO2-O-ACTAGGCCGTCGTTT-" should read
-- 5'-HS-(CH2)6-O-PO2-O-ACTGGCCGTCGTTT- --.

UNITED STATES PATENT AND TRADEMARK OFFICE
CERTIFICATE OF CORRECTION

PATENT NO. : 7,338,810 B2
APPLICATION NO. : 10/459498
DATED : March 4, 2008
INVENTOR(S) : Tomohiro Suzuki It is certified that error appears in the above-identified patent and that said Letters Patent is hereby corrected as shown below:

COLUMN 8:

Line 35, "storage" should read -- stored --.

Signed and Sealed this

Nineteenth Day of August, 2008

JON W. DUDAS
*Director of the United States Patent and Trademark Office*